UNITED STATES PATENT OFFICE

2,251,485

SHORTENING STABILIZATION

Donald P. Grettie, Chicago, Ill., assignor to Industrial Patents Corporation, Chicago, Ill., a corporation of Delaware No Drawing. Application March 15, 1939,
Serial No. 261,961

14 Claims. (Cl. 99—163)

This invention relates to an improved process of treating edible fats and oils.

One of the objects of the invention is to provide a method for stabilizing against rancidity edible fats and oils such as lard, beef fat, hydrogenated cottonseed oil, and other vegetable and animal fats and oils and mixtures thereof.

Another object of the invention is to provide as an article of commerce, an improved shortening product stabilized against rancidity.

Another object of the invention is to provide an antioxidant for fats and oils which will retard the onset of rancidity and will issue a negative Kreis test during a relatively long induction period.

This application is a continuation in part of my application entitled Shortening treatment, Serial No. 95,631, filed August 12, 1936, which was granted on April 1, 1941, as Patent No. 2,236,569.

For the purpose of illustration, but not by way of limitation, the invention is hereinafter described as practiced with lard.

The present invention is based upon the discovery that the tendency of fats and oils to become rancid and to develop a positive Kreis test can be retarded by treatment with hydroxy monobasic aliphatic acids. This invention permits the stabilizing of fats and oils against rancidity without in any way affecting the characteristic flavor of the shortening treated.

Divers substances have been proposed from time to time as antioxidants for fats and oils, including aromatic acids and such polybasic acids as citric acid.

The present invention is particularly directed to the employment of monobasic sugar acids as antioxidants.

Examples of monobasic sugar acids which may be employed in carrying out the present invention are set out below:

1. Pentose sugar acid___ CH$_2$OH(CHOH)$_3$COOH
2. Hexose sugar acid ___ CH$_2$OH(CHOH)$_4$COOH Effective stabilization of lard may be obtained by the addition of less than 0.1 per cent of monobasic sugar acids.

Examples of pentose sugar acids which may be employed in practicing the present invention are arabonic acid, which may be derived from arabinose, xylonic acid, which may be derived from xylose and ribonic acid which may be derived from ribose. Rhamnonic acid, which may be derived from rhamnose, may also be employed. The sugar rhamnose, although it has six carbon atoms, is classed as a pentose since one of the carbon atoms is in a side chain. Examples of hexose sugar acids, which may be employed in practicing the present invention, are galactonic acid, which may be derived from galactose, gluconic acid, which may be derived from glucose, and mannonic acid, which may be derived from mannose. Other hexose sugar acids may also be employed, but the three mentioned are the most important since the corresponding sugars are the most commonly occurring of the hexose sugars. I have found in practice that effective stabilization may be secured by the addition of from 0.001 per cent to 0.1 per cent of the sugar acids. It will be understood, of course, that some stabilization is secured with smaller amounts and that the effect is progressive as the amount is increased, although the addition of larger amounts gives little apparent increase in stabilizing effect.

An example of the stabilizing effect of gluconic acid is given in the following table:

Table A

1. Lard (unstabilized).
2. Lard containing 0.1 per cent gluconic acid.

| Hours incubation at 70° C. | Milliequivalents of peroxide per kilo of fat | |
|---|---|---|
| | 1 | 3 |
| 18 | 15 | 13 |
| 42 | ¹ 30 | 22 |
| 66 | ¹ 70 | ¹ 52 |

¹ Rancid.

The stability as determined by the accelerated active oxygen (peroxide keeping test) is as follows:

| | Hours |
|---|---|
| Lard | 2 |
| Lard containing 0.01 per cent gluconic acid | 4 |

It will be seen from the foregoing data that gluconic acid has a positive stabilizing effect on lard.

Although lard has been discussed by way of illustration in describing this invention, it will be understood that the invention is not limited to lard but comprehends edible vegetable and animal fats and oils adapted for use as a shortening and the like. The word "shortening" as used in this specification and the claims which follow will be understood to include edible animal and vegetable fats and oils such as lard, beef fat, hydrogenated cottonseed oil, kapok oil, sunflower seed oil, palm oil, soya bean oil, and the like.

I claim:

1. The method of stabilizing shortening which comprises adding thereto and incorporating therewith a quantity of a monobasic sugar acid.

2. The method of stabilizing shortening which comprises adding thereto and incorporating therewith a quantity of pentose sugar acid.

3. The method of stabilizing shortening which comprises adding thereto and incorporating therewith from 0.001 per cent to 0.1 per cent pentose sugar acid.

4. The method of stabilizing shortening which comprises adding thereto and incorporating therewith a quantity of arabonic acid.

5. The method of stabilizing shortening which comprises adding thereto and incorporating therewith a quantity of hexose sugar acid.

6. The method of stabilizing shortening which comprises adding thereto and incorporating therewith from 0.001 per cent to 0.1 per cent hexose sugar acid.

7. The method of stabilizing shortening which comprises adding thereto and incorporating therewith a quantity of galactonic acid.

8. The method of stabilizing shortening which comprises adding thereto and incorporating therewith a quantity of gluconic acid.

9. As an article of commerce, a shortening product stabilized against rancidity consisting of a large proportion of shortening and a complement of a monobasic sugar acid.

10. As an article of commerce, a shortening product stabilized against rancidity consisting of a large proportion of shortening and a complement of pentose sugar acid.

11. As an article of commerce, a shortening product stabilized against rancidity consisting of a large proportion of shortening and a complement of arabonic acid.

12. As an article of commerce, a shortening product stabilized against rancidity consisting of a large proportion of shortening and a complement of hexose sugar acid.

13. As an article of commerce, a shortening product stabilized against rancidity consisting of a large proportion of shortening and a complement of galactonic acid.

14. As an article of commerce, a shortening product stabilized against rancidity consisting of a large proportion of shortening and a complement of gluconic acid.

DONALD P. GRETTIE.